(12) United States Patent
Kawachiya et al.

(10) Patent No.: US 9,208,151 B2
(45) Date of Patent: Dec. 8, 2015

(54) METHOD, PROGRAM, AND SYSTEM FOR SPECIFICATION VERIFICATION

(71) Applicant: International Business Machines Corporation, Armonk, NY (US)

(72) Inventors: Kiyokuni Kawachiya, Tokyo (JP); Michiaki Tatsubori, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 327 days.

(21) Appl. No.: 13/658,884

(22) Filed: Oct. 24, 2012

(65) Prior Publication Data

US 2013/0103652 A1 Apr. 25, 2013

(30) Foreign Application Priority Data

Oct. 25, 2011 (JP) ................................. 2011-234338

(51) Int. Cl.
*G06F 7/00* (2006.01)
*G06F 17/00* (2006.01)
*G06F 17/30* (2006.01)

(52) U.S. Cl.
CPC ............................... *G06F 17/30011* (2013.01)

(58) Field of Classification Search
CPC ............................................... G06F 17/30011
See application file for complete search history.

(56) References Cited

U.S. PATENT DOCUMENTS

| 4,754,400 | A | | 6/1988 | Wakahara et al. | |
|---|---|---|---|---|---|
| 5,768,498 | A | * | 6/1998 | Boigelot et al. | 714/39 |
| 7,318,216 | B2 | * | 1/2008 | Diab | 717/108 |
| 2002/0133491 | A1 | * | 9/2002 | Sim et al. | 707/10 |
| 2002/0156840 | A1 | * | 10/2002 | Ulrich et al. | 709/203 |
| 2003/0172357 | A1 | * | 9/2003 | Kao et al. | 715/529 |
| 2006/0161404 | A1 | * | 7/2006 | Campbell et al. | 703/2 |
| 2007/0088751 | A1 | * | 4/2007 | DeFelice et al. | 707/104.1 |
| 2008/0022270 | A1 | * | 1/2008 | Morrow et al. | 717/155 |
| 2009/0287963 | A1 | * | 11/2009 | Oglesby et al. | 714/38 |

FOREIGN PATENT DOCUMENTS

| JP | S6171750 | A | | 4/1986 |
|---|---|---|---|---|
| JP | 05236052 | A | * | 9/1993 |

(Continued)

OTHER PUBLICATIONS

Nagashima, Provision No. 55, 2007, URL: http://www-06.ibm.com/ibm/jp/provision/no55/pdf/55_sec_public.pdf.

*Primary Examiner* — Marc Somers
(74) *Attorney, Agent, or Firm* — Scully, Scott, Murphy & Presser, P.C.; Jeff Tang, Esq.

(57) ABSTRACT

A method, program, and system for specification verification. The method includes the steps of: (a) retaining a plurality of documents as groups of abstract documents that display values capable of indicating each metadata; (b) separating the group of abstract documents based on an input condition of an operation; (c) adding a new abstract document by using, based on an output condition, at least one the operation within a group of the operations; (d) separating the abstract documents according to overlapping ranges designated by the metadata; (e) unifying the abstract documents according to overlapping ranges designated by the metadata; (f) repeating the steps (b) to (e) until a termination condition is satisfied; and (g) verifying whether an incomplete abstract document exists when the termination condition is satisfied.

18 Claims, 17 Drawing Sheets

(56) References Cited

FOREIGN PATENT DOCUMENTS

| | | | |
|---|---|---|---|
| JP | H06161759 A | 6/1994 |
| JP | 08-221399 A | 8/1996 |
| JP | 2007-058750 A | 3/2007 |
| JP | 2009-042865 A | 2/2009 |
| JP | 2010067214 A | 3/2010 |

* cited by examiner

METHOD, PROGRAM, AND SYSTEM FOR SPECIFICATION VERIFICATION

CROSS-REFERENCE TO RELATED APPLICATION

This application claims priority under 35 U.S.C. §119 from Japanese Patent Application No. 2011-234338 filed Oct. 25, 2011, the entire contents of which are incorporated herein by reference.

BACKGROUND OF THE INVENTION

1. Field of the Invention

The present invention relates to a specification verification method for an application that is implemented by a computer. More specifically, the present invention relates to a specification verification technique that is suitable for document centric architecture.

2. Description of Related Art

Document centric architecture has been proposed and is being adopted in recent years in the field of computer applications.

According to a document centric architecture, most work is started by writing a document. The required documents for such work are then collected and end with the drafting of a different document. During such work, the documents involved in the work include essential information for executing the work. Thus, according to document centric architecture, a system is constructed based on documents and specifications, while taking a single unit of work to be a single drafting of one or multiple documents.

According to document centric architecture, states are associated with the metadata of the documents. If metadata A and B exist, the state of the metadata of a certain document, for example, can be described as "A is 15, and B is 0."

The specifications of this document centric architecture include the below described types of operations, information on the initial documents, and completion condition.

Initial documents: A is greater than or equal to 0 and less than or equal to 20, and B is 0.
Operation X: Processing is performed for documents where A is less than 30, and as a result, A is set to 40 and B is set to A.
Operation Y: Processing is performed for documents where A is greater than 10 and less than 50, and as a result, A is set to 100.
Operation Z: Processing is performed for documents where A is greater than or equal to 40 and B is less than 10, and as a result, B is set to 100.
Completion condition: For documents where both A and B have become 100, processing is completed.

In this case, according to an ideally created specification, processing will inevitably lead to the completion condition, if the above processing operations are applied to an initial document that has an appropriate metadata condition. However, when using real specifications after the application of processing operations, it is possible to generate documents that end up being abandoned before reaching the completion condition.

Further, when the number of operations and the type of documents are prepared in the document centric architecture, it has been impossible, within a practical processing time, to check all values on whether or not all documents will be correctly processed.

Japanese Unexamined Laid-open Patent Application No. 08-221399 discloses: referencing corresponding relationships between information (pseudo tags) indicating document logical structure defined beforehand by the user and multiple document logic structure definitions (document form definitions); finding of the degree of matching (search frequency) between the various document form definitions and source text drafted by the user using pseudo tags; displaying the document form definitions in order of degree-of-matching; and asking the user to select document form definitions. Then, according to the document form definitions selected by the user, the pseudo tags within the source text are converted to: information (SGML tag information) expressing document logic structure based on the document form definitions; and text including the conversion result is analyzed by a parser (SGML parser) for performing syntax analysis based on the document form definitions. Thereafter, consistency of the conversion result is verified.

Japanese Unexamined Laid-open Patent Application No. 2007-58750 discloses drafting of a data specification document that describes, in a language readily understood and described by a human, specifications of each data element included in an XML document, which describes application data and conditions to be fulfilled by each data element in relation to other data elements and the verification procedures for such conditions. A verification data generation device, based on a data specification description document, generates verification procedure data (XSLT script) for verification by computer of whether or not each of the data elements including in the target XML document satisfies the conditions described in this data specification description document.

Japanese Unexamined Laid-open Patent Application No. 2009-42865 discloses a system in which a reception unit of a data processing device receives a process identifier that specifies a process as a target relating to internal control, a search unit document component relating to the process identifier is received by the aforementioned reception unit, a verification unit verifies a relationship between the aforementioned document component searched by the search unit and another document component or document, and a results output unit outputs the results of the aforementioned verification by the verification unit.

However, none provides a plan for document centric architecture to solve the problems of comprehensiveness or processing time for verification of documents that have metadata.

SUMMARY OF THE INVENTION

Accordingly, one aspect of the present invention provides a method for verifying a specification, including the steps of: (a) retaining, by a processor of a computer system, a plurality of documents as groups of abstract documents that display values capable of indicating each metadata; (b) separating, by the processor, the group of abstract documents based on an input condition of an operation; (c) adding, by the processor, a new abstract document by using, based on an output condition, at least one the operation within a group of the operations; (d) separating, by the processor, the abstract documents according to overlapping ranges designated by the metadata; (e) unifying, by the processor, the abstract documents according to overlapping ranges designated by the metadata; (f) repeating the steps (b) to (e) until a termination condition is satisfied; and (g) verifying, by the processor, whether an incomplete abstract document exists when the termination condition is satisfied; where the plurality of documents associated with a plurality of the metadata are processed; where the group of the operations are applied collectively by an operation specification; where the input condition that is a condition of a range of the metadata capable of application of a respective operation is retained for each of the operation; and where an output condition that is a change of the metadata after use of the respective operation is retained for each of the operation.

Another aspect of the present invention provides a computer readable storage medium tangibly embodying a computer readable program code having computer readable instructions which when implemented, cause a computer to carry out the steps of a method including: (a) retaining, by a processor of a computer system, a plurality of documents as groups of abstract documents that display values capable of indicating each metadata; (b) separating, by the processor, the group of abstract documents based on an input condition of an operation; (c) adding, by the processor, a new abstract document by using, based on an output condition, at least one the operation within a group of the operations; (d) separating, by the processor, the abstract documents according to overlapping ranges designated by the metadata; (e) unifying, by the processor, the abstract documents according to overlapping ranges designated by the metadata; (f) repeating the steps (b) to (e) until a termination condition is satisfied; and (g) verifying, by the processor, whether an incomplete abstract document exists when the termination condition is satisfied; where the plurality of documents associated with a plurality of the metadata are processed; where the group of the operations are applied collectively by an operation specification; where the input condition that is a condition of a range of the metadata capable of application of a respective operation is retained for each of the operation; and where an output condition that is a change of the metadata after use of the respective operation is retained for each of the operation.

Another aspect of the present invention provides a specification verification system, including: a processor device configured to: (a) retain a plurality of documents as groups of abstract documents that display values capable of indicating each metadata; (b) separate the group of abstract documents based on an input condition of an operation; (c) add a new abstract document by using, based on an output condition, at least one the operation within a group of the operations; (d) separate the abstract documents according to overlapping ranges designated by the metadata; (e) unify the abstract documents according to overlapping ranges designated by the metadata; (f) repeat functions (b) to (e) until a termination condition is satisfied; and (g) verify whether an incomplete abstract document exists when the termination condition is satisfied; where the plurality of documents associated with a plurality of the metadata are processed; where the group of the operations are applied collectively by an operation specification; where the input condition that is a condition of a range of the metadata capable of application of a respective operation is retained for each of the operation; and where an output condition that is a change of the metadata after use of the respective operation is retained for each of the operation.

DETAILED DESCRIPTION OF THE PREFERRED EMBODIMENTS

Figure 1:
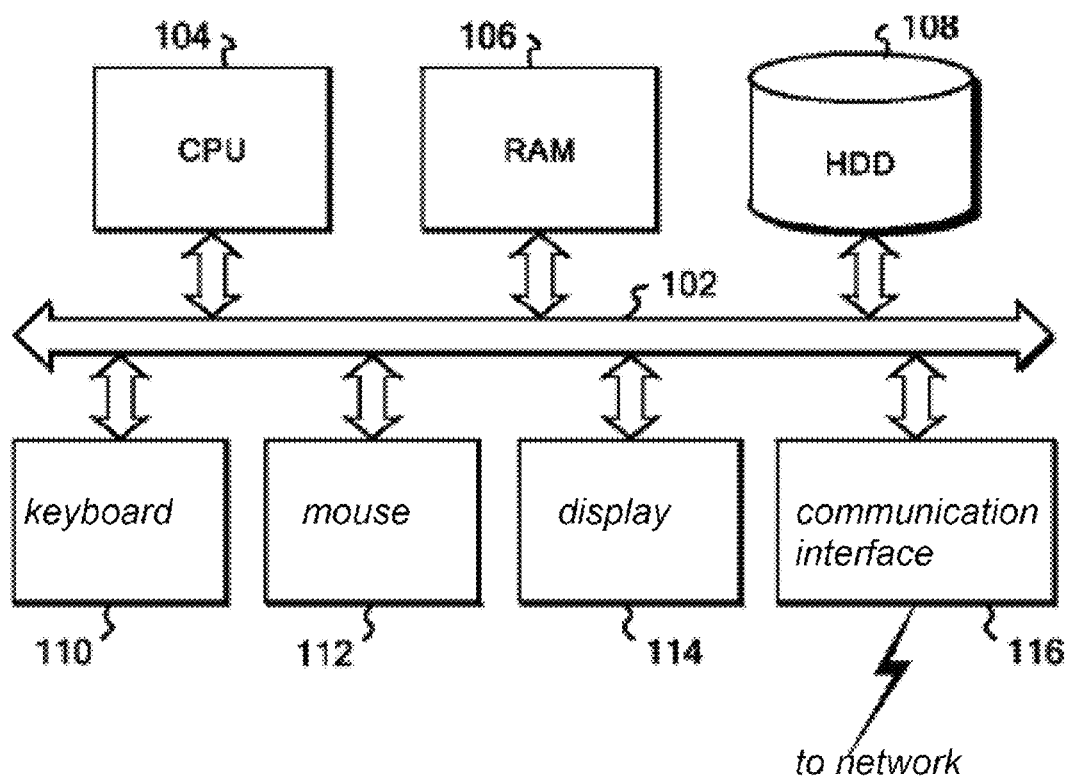
FIG. 1 shows a block diagram of a hardware structure for implementation of the present invention.

The above and other features of the present invention will become more distinct by a detailed description of embodiments shown in combination with attached drawings. Identical reference numbers represent the same or similar parts in the attached drawings of the invention.

As will be appreciated by one skilled in the art, aspects of the present invention can be embodied as a system, method or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention can take the form of a computer program product embodied in one or more computer readable medium(s) having computer readable program code embodied thereon.

Any combination of one or more computer readable medium(s) can be utilized. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It is the object of the present invention to provide a technique that is capable of verification and of reduction of the complexity resulting from inclusion of metadata.

It is another object of this invention to provide a technique for document centric architecture that is capable of effective verification of whether or not a document is present for which processing will not proceed.

The present invention was developed in order to solve the aforementioned problems. The key idea of the present invention is to manage metadata as being associated with an "abstract document" rather than treating the document itself.

The system of the present invention prepares a logical "document box," places multiple abstract documents of the initial state in the document box, applies possible processing (operations) to such, and creates a state transition diagram of abstract documents. Then the system of the present invention verifies whether or not the completion condition is reached for all abstract documents in the generated state transition diagram.

Preferably at this time, the system of the present invention specifically repeats the application of each operation to the abstract document. Then the abstract document is separated according to the input conditions and the outputted abstract documents are unified with existing abstract documents.

The processing procedure of the present invention is described more concretely as follows.

(1) Each operation is abstracted while paying attention to what the conditions are when the process is evoked and what happens to each metadata after processing. At this time, there is no need to pay attention to what the type of the specific operation is.

(2) Only variations of the metadata that are possible as initial documents are placed in the "document box." Due to abstracting of the document at this time, only the range of possible metadata is described.

(3) Each of the operations abstracted at (1) is used in turn on this group of abstract documents, and the "transition diagram" is created. Specifically, the creation is performed in the following manner.

(3a) Firstly, the abstract document group is separated based on the input conditions of processing.

(3b) Processing is applied to the abstract document group, and abstract documents in keeping with the processing output condition are added to the document box.

(3c) Among the abstract documents, those where there is a overlap in the metadata are separated and integrated.

(4) Each of the operations (including completion conditions) is repeated, and if the result becomes unchanging, processing ends.

(5) Within the completed transition diagram, verification is successful if the completion condition is reached for all abstract documents. At this time, (5a) if there is an abstract document for which the completion condition can not be reached, the transition of that abstract document is reported.

(5b) If there is an operation that was not used even a single time, that is also reported as an unused operation.

According to the present invention, after documents are separated into abstract documents using the ranges of values of metadata in document centric architecture, by the use of all processing that is capable of being used on the abstract documents, it becomes possible by a logical procedure to verify whether or not the design specification of a document centric system is correct. Moreover, it is possible to present under what sort of processing procedures it is generated, and it becomes possible to discover processing that is not used.

In sum, documents are managed as "abstract documents" that are separated by ranges of values of metadata. The system of the present invention prepares a logical "document box," inserts multiple abstract documents of the initial condition, and uses operations that are possible for such abstract documents. Separation and unification of the abstract documents are performed as required during use of the operations. The operations are repeatedly used on the abstract document group, and with respect to a state transition diagram at the point in time when changes have stopped, verification is performed as to whether all abstract documents have reached the completion condition.

FIG. 1 shows a block diagram for computer hardware for performing processing and system structure according to an embodiment of the present invention. Within FIG. 1, a CPU 104, a main memory 106, a hard disk drive (HDD) 108, a keyboard 110, a mouse 112, and a display 114 are connected to a system bus 102. A chip based on 32 bit or 64 bit architecture is preferably used as the CPU 104, as exemplified by a Pentium® 4, Core® 2 Duo, or Xeon® manufactured by Intel Corp., an Athlon® manufactured by AMD Corp., or the like. The main memory 106 preferably has a capacity of at least 4 GB. The hard disk drive 108 preferably has a capacity of at least 500 GB, for example.

Although not shown in detail, an operating system is stored beforehand on the hard disk drive 108. Any operating system suitable for the CPU 104 can be used, as exemplified by Linux®, or Windows® 7 and Windows XP® produced by Microsoft Corp., or the Mac OS® produced by Apple Computer Corp., or the like.

The hard disk drive 108 further contains, as described below in relation to FIG. 2, a main routine 202, a design specification file 204, a metadata class extraction routine 208, an abstract document separation routine 210, an abstract document adding routine 212, a separation and unification routine 214, a separation routine 216, a unification routine 218, and a verification routine 220. These processing routines can be drafted in an existing programming language processing system such as C, C++, C#, Java®, or the like. Due to running of the operating system, these modules are loaded in main memory 106 and are executed. Details of operation of these routines will be described more specifically in reference to the function block diagram of FIG. 2.

The keyboard 110 and the mouse 112 operate a certain GUI screen (not illustrated) and are used for starting the aforementioned processing routines or the like, and entering text, or the like.

A liquid crystal display is preferably used as the display 114 of arbitrary resolution, e.g. XGA (1024×768 pixel resolution), UXGA (1600×1200 pixel resolution), or the like. The display 114 is used for display of verification results of the specification.

The system of FIG. 1 is further connected to an external network such as a LAN, WAN, or the like through a communication interface 116 connected to the bus 102. The communication interface 116, using Ethernet® or the like, performs data exchange with a server, client computer, or the like located on an external network.

Although a system having document centric architecture accesses a centrally managed data memory system, such a system is based on software architecture determined by rules such that multiple constituent computer systems do not deal directly with one another. Since the system of the present invention is a system for verification of a specification for document centric architecture, the system of the present invention is not required to be a system that has document centric architecture.

That is to say, the system of the present invention can be implemented using any form of computer device, such as a personal computer, work station, mainframe computer, or the like. Moreover, although FIG. 1 shows an embodiment that is connected to a network, this configuration is not limiting, and implementation is possible using a stand-alone configuration. Conversely, implementation is also possible in the form of parallel or distributed processing using multiple computer devices connected together by a network.

Figure 2:
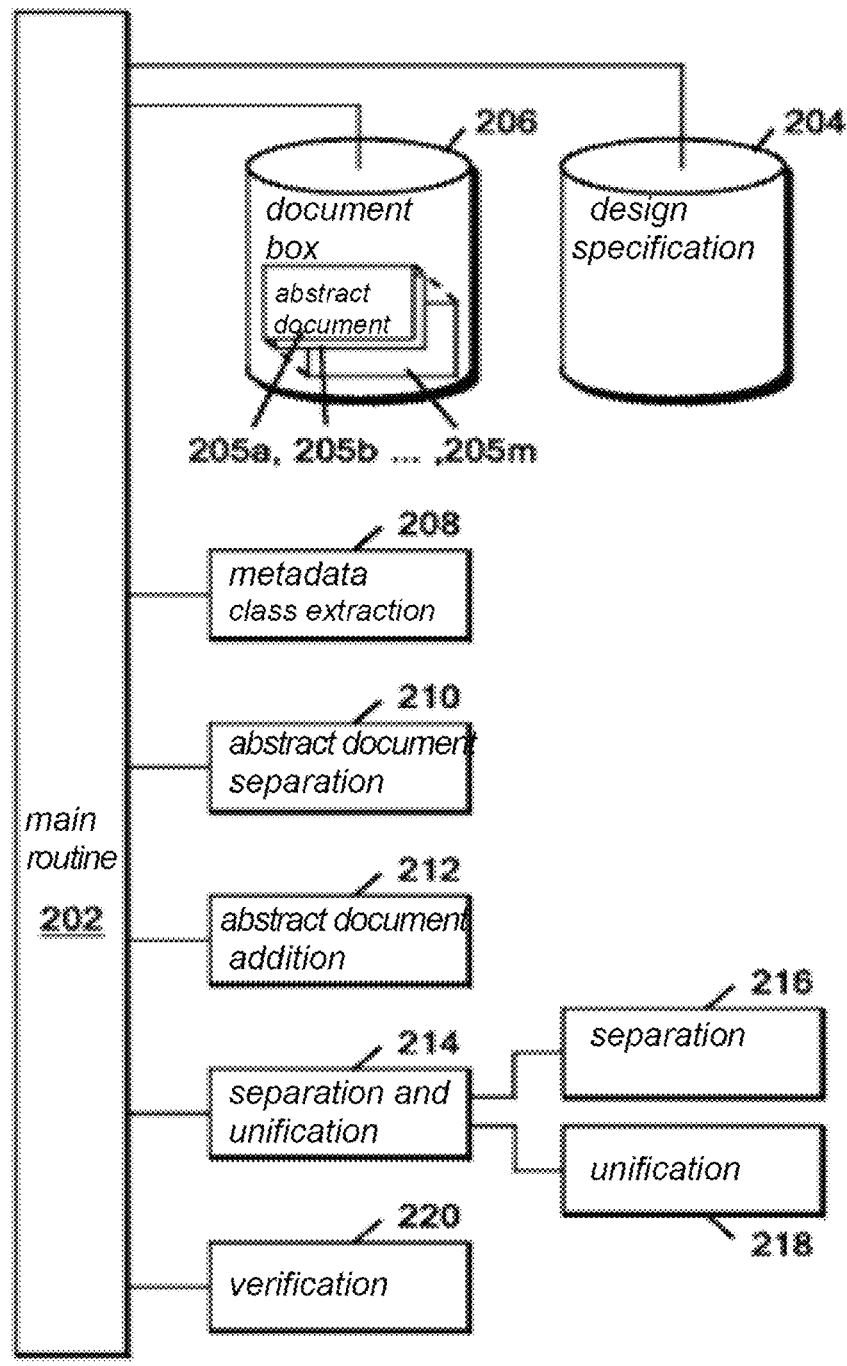
FIG. 2 shows a block diagram of a function configuration for implementation of the present invention.

FIG. 2 is a function block diagram showing logical structure for execution of the present invention. Within FIG. 2, a design specification file 204 is stored on the hard disk drive 108 in a computer-readable format. More specifically, as shown in FIG. 3, this design specification file 204 includes data indicating initial document conditions 302, operations 306a, 306b, . . . 306k, and completion conditions 304.

Figure 3:
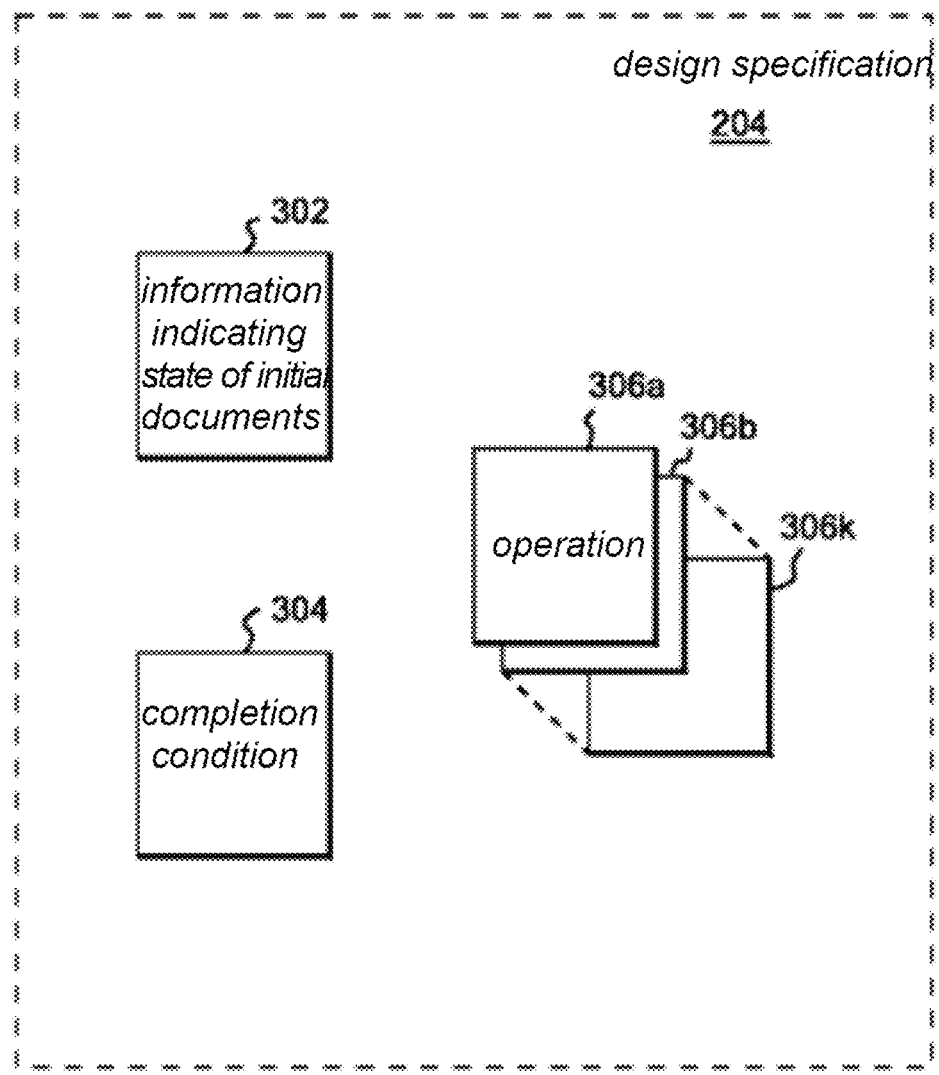
FIG. 3 shows the essential composition of a design specification according to an embodiment of the present invention.

Although not indicated specifically in FIG. 3, in one embodiment, there is a design document for each type of document, and XML schema are imparted corresponding to each. The metadata are also described by XML schema.

The abstract documents 205a, 205b, . . . 205m are logical objects for separation of the documents according to the ranges of values of the metadata. These abstract documents are put in the document box 206, which is an allocated region of main memory 106. If the available capacity of main memory 106 is insufficient, area on the hard disk drive 108 can be allocated for the document box 206.

Returning to FIG. 2, the main routine 202 is preferably a routine for displaying a GUI (not illustrated) on the display 114, for receiving user operations by operation of the keyboard 110, mouse 112, or the like, and for overall processing. Details of this processing will be explained later in reference to the flowchart of FIG. 4.

The metadata class extraction routine 208 is a routine for execution of processing for extraction of classes of metadata from the operations in the specification. Details of such processing will be explained later in reference to the flowchart of FIG. 5.

The abstract document separation routine 210 is a routine for execution of processing that divides the abstract document group. Details of such processing will be explained later in reference to the flowchart of FIG. 6.

The abstract document adding routine 212 is a routine for use of processing on the abstract document group and for execution of processing that adds the abstract document group to the document box in keeping with the operation output condition. Details of such processing will be explained later in reference to the flowchart of FIG. 7.

The separation and unification routine 214 is a routine for executing separation and unification processing, among the abstract documents, for those abstract documents where there is overlap in the metadata. Details of such processing will be explained later in reference to the flowchart of FIG. 8.

The separation routine 216 is a routine called by the abstract document separation routine 210 and the separation and unification routine 214 and is a routine for executing processing to separate the abstract document. Details of such processing will be explained later in reference to the flowchart of FIG. 9.

The unification routine 218 is a routine called by the separation and unification routine 214 and is used for executing processing to integrate abstract documents. Details of such processing will be explained later in reference to the flowchart of FIG. 10.

The verification routine 220 is a routine for execution of verification processing. Details of such processing will be explained later in reference to the flowchart of FIG. 11.

Figure 4:
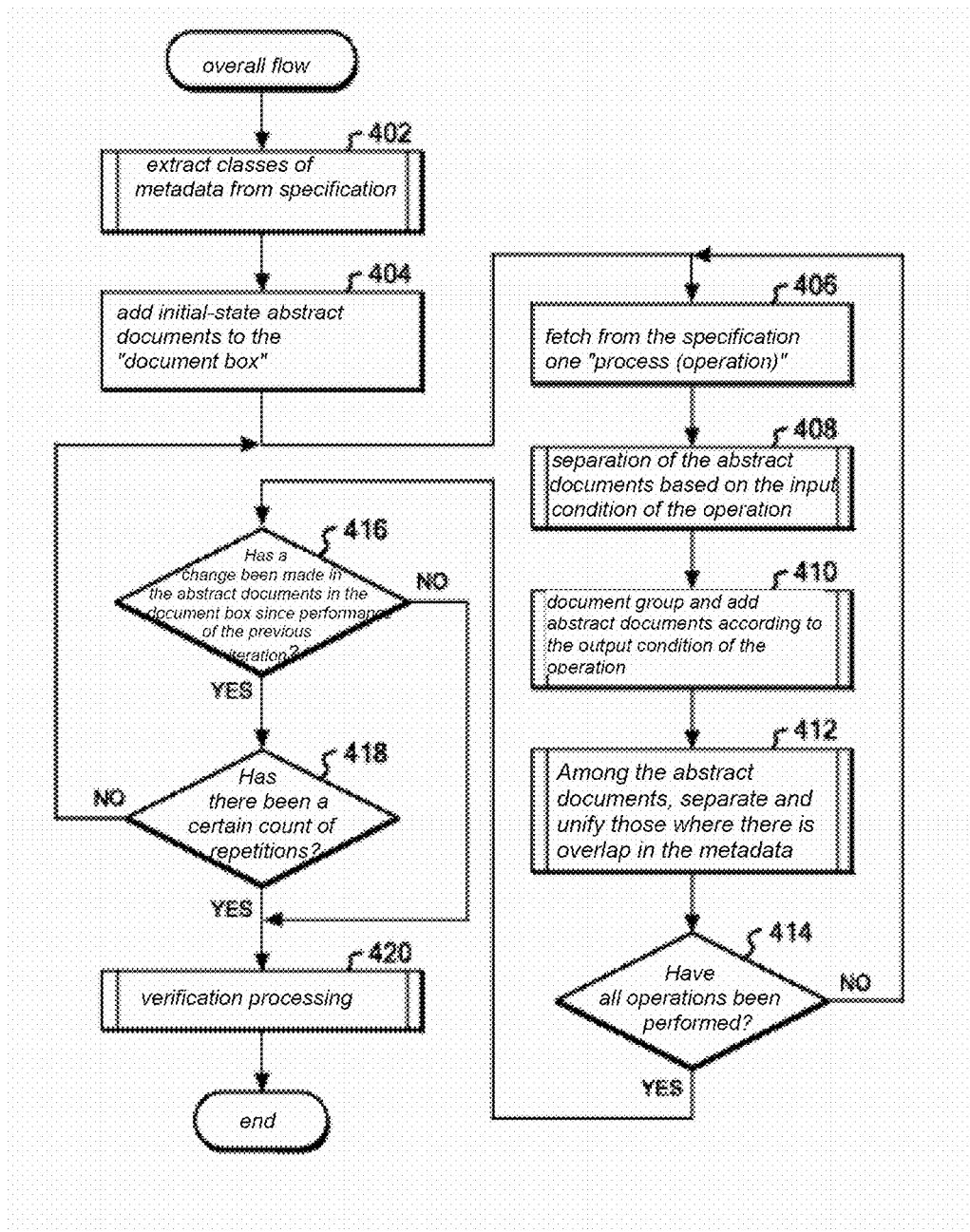
FIG. 4 shows a flowchart of overall processing according to an embodiment of the present invention.

Next, the overall processing executed by the main routine will be explained while referring to FIG. 4. During step 402, the main routine called the metadata class extraction routine 208 and extracts the classes of the metadata from the specification.

During step 404, for the initial state, the main routine 202 adds to the "document box" 206 designated documents. Here, the term "document box" 206 refers to a memory region allocated in the main memory, and a document is disposed therein as an object.

During step 406, from the design specification 204, one item is fetched from among the "processes (operations)" 306*a*, 306*b*, . . . 306*k* and the completion condition 304.

During step 408, the main routine 202 calls the abstract document separation routine 210, and the abstract document group is separated based on the input condition of the operation obtained during the step 406. At this time, the separated abstract document replaces the original abstract document, and links for the original abstract document are retained. This will be much better understood by referring to the below described examples related to FIGS. 12 to 20.

During step 410, the main routine 202 applies an operation to the abstract document group, calls the abstract document adding routine 212, and adds abstract documents according to the output condition of the operation. At this time, the abstract document prior to use of the operation and the abstract document added due to use of the operation are connected by a link. That is to say, the abstract document group forms a graph structure that links abstract documents as nodes and operations as links.

During step 412, the main routine 202 calls the separation and unification routine 214, and performs separation and unification for those abstract documents in the document box and for which there is overlap in the metadata. The separation routine 214 accordingly calls the separation routine 216 and the unification routine 218.

During step 414, the main routine 202 determines whether or not all processing and the completion condition have been performed, and execution returns to step 406 is these have not been performed. If a determination is made that all processing has been performed, then the main routine 202 proceeds to step 416, a determination is made as to whether or not there has been a change in the abstract document in the document box since performance of the previous step. If there was no change, then execution proceeds to the step 420 verification processing. If there has been a change, execution proceeds to step 418, and a determination is made as to whether or not the use of the group of operations has been repeated a certain number of times. When the processing operations have not been repeated for a certain number of times, execution returns to step 406. If processing has been repeated for the certain number of times, execution proceeds to the verification processing of step 420.

During step 420, the main routine 202 calls the verification routine 220 and performs verification processing.

Figure 5:
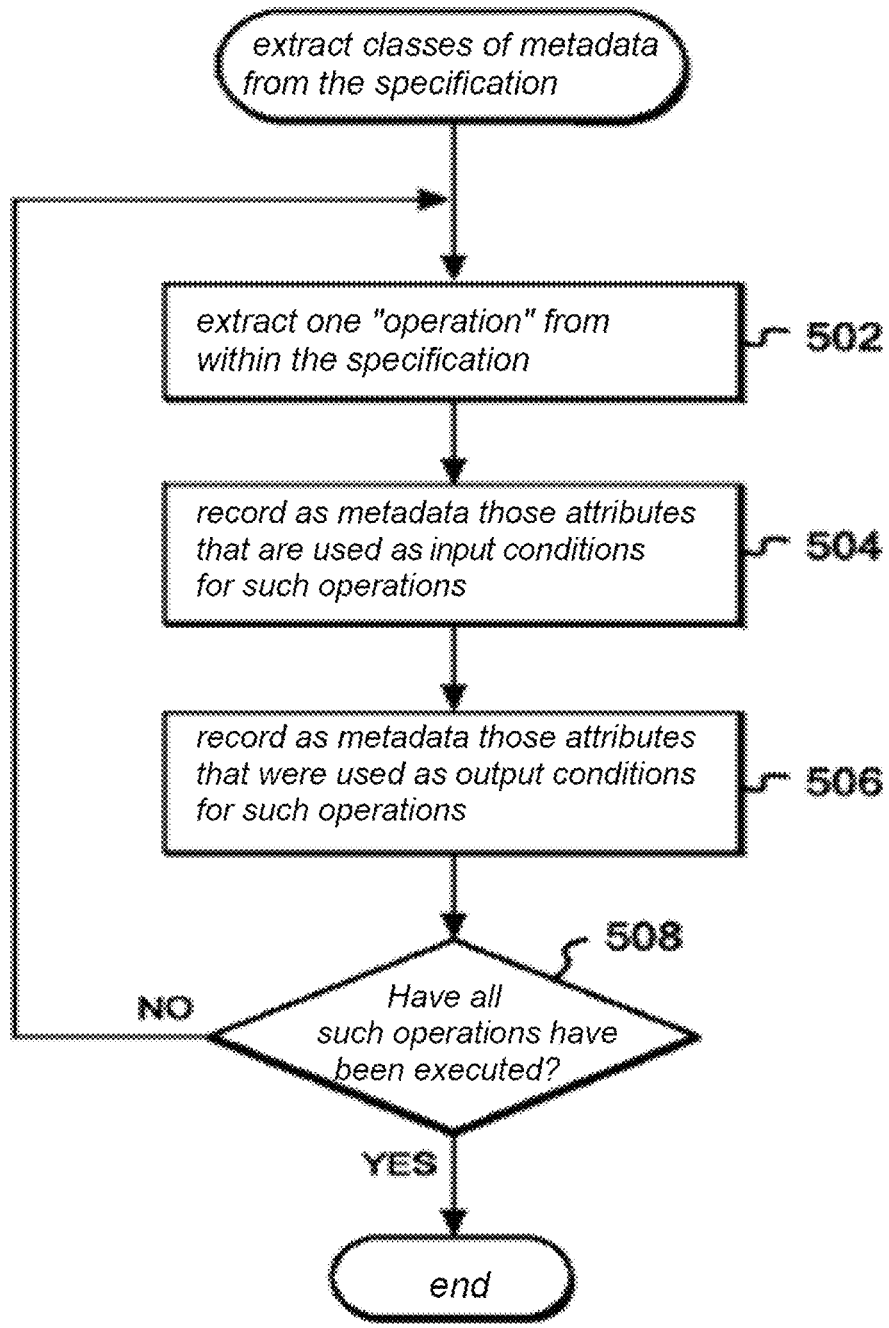
FIG. 5 shows a flowchart of extracting classes of metadata from the specification according to an embodiment of the present invention.

Next, while referring to the flowchart of FIG. 5, processing of the metadata class extraction routine 208 for extraction of classes of metadata from the specification will be explained.

During step 502, the metadata class extraction routine 208 extracts one "operation" from within the specification. Furthermore, the completion condition is considered here to be one of the operations.

During step 504, the metadata class extraction routine 208 records as metadata those attributes that are used as input conditions for such operations.

During step 506, the metadata class extraction routine 208 records as metadata those attributes that were used as output conditions for such operations.

During step 508, the metadata class extraction routine 208 makes a determination of whether or not all operations have been executed, and if all such operations have been executed, processing is completed. If all such processing has not been executed, processing returns to step 502.

Figure 6:
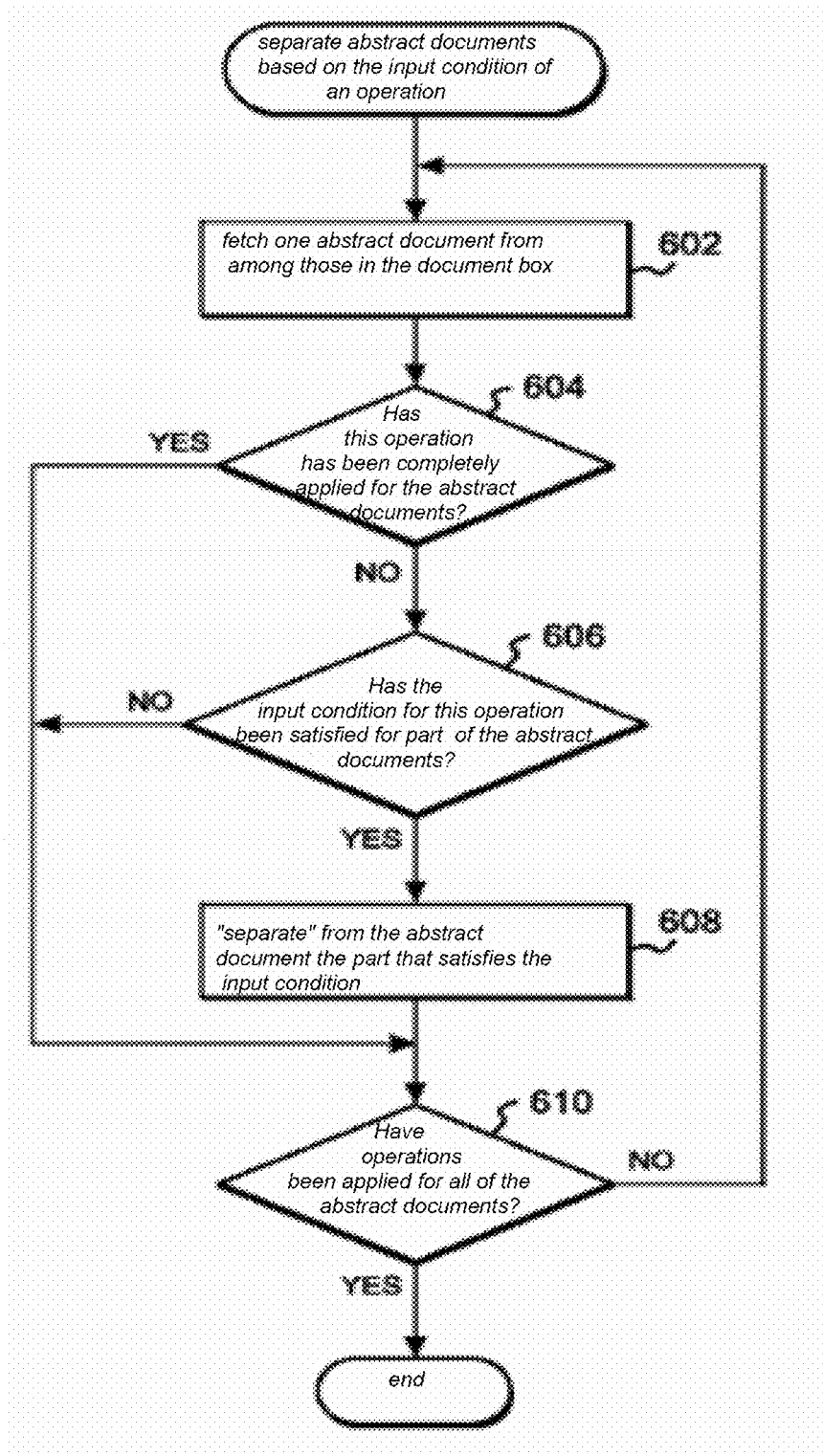
FIG. 6 shows a flowchart of dividing the abstract document group based on the input conditions of processing according to an embodiment of the present invention.

Next, processing of the abstract document separation routine 210, for separation of the abstract document group according to the designated operation input conditions, will be explained while referring to the flowchart of FIG. 6.

During step 602, the abstract document separation routine 210 fetches one abstract document from among those in the document box.

During step 604, the abstract document separation routine 210 determines whether this operation has already been applied for the abstract document, and if processing is already applied, execution shifts to step 610.

When a determination is made that this processing has not been applied to the abstract document, the abstract document separation routine 210, during step 606, makes a determination as to whether the input condition for this operation is satisfied for part of the abstract document, and if such is not the case, execution proceeds to step 610.

During step 606, when there is a determination that input conditions for this processing are satisfied for part of the abstract document, then the abstract document separation routine 210 divides from the abstract document the part that satisfied the input conditions during step 608, and execution proceeds to step 610. Furthermore, the separation processing of step 608 is performed using the separation routine 216.

During step 610, the abstract document separation routine 210 makes a determination of whether or not operations have been applied for all of the abstract documents. If the determination is that such processing has not been performed, execution returns to step 602. If the determination is that such processing has been performed, processing ends.

Figure 7:
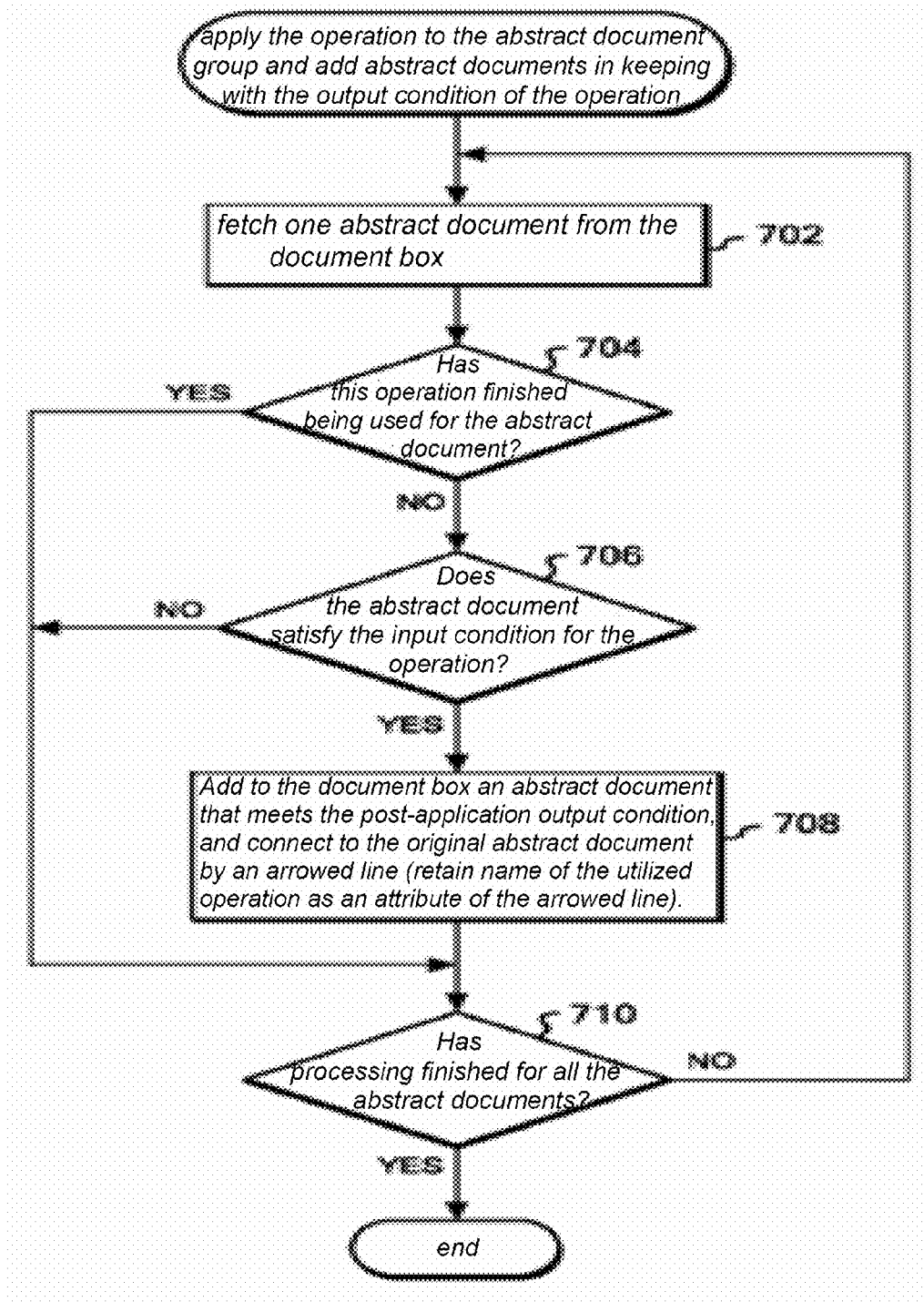
FIG. 7 shows a flowchart of processing on the abstract document group and adding an abstract document in keeping with the output conditions of processing according to an embodiment of the present invention.

Next, the processing of the abstract document adding routine 212 will be explained while referring to the flowchart of FIG. 7. This abstract document adding routine 212 uses operations designated by the abstract document group and adds abstract documents in keeping with the output conditions.

During step 702, the abstract document adding routine 212 fetches 1 abstract document from the document box.

During step 704, the abstract document adding routine 212 makes a determination if this operation has been used for the abstract document. If the operation has been used, execution proceeds to step 710.

When a determination is made that use of this operation on one of the abstract documents has not occurred, during step 706 the abstract document adding routine 212 makes a determination of whether or not the abstract document satisfies the input condition for this operation, and execution proceeds to step 710 if the determination is that the input condition is not satisfied. Note that according to the abstract document separation routine 210, there is no occurrence of a condition in which the input condition is satisfied for just "a portion" of the abstract document. Each extracted document is either a document where there is "overall satisfaction of this operation input condition" or is a document where there is "overall non-satisfaction of this operation input condition."

When it had been determined during step 706 that the abstract document does satisfy the input condition for this operation, the abstract document adding routine 212 during step 708 adds to the document box an abstract document that meets the post-application output condition, and this abstract document is connected to the original abstract document by an arrowed line (link) therefrom. At this time, the name of the applied operation is retained as an attribute of the arrowed line. The execution returns to step 710. The meaning of an arrowed line from or to an abstract document will be explained later in reference to the specific examples of FIGS. 12 to 20.

During step 710, a determination is made as to whether or not the abstract document adding routine 212 has been performed for all of the abstract documents. If this has not been performed for all of the abstract documents, execution returns to step 702. If this has been performed for all the abstract documents, execution ends.

Figure 8:
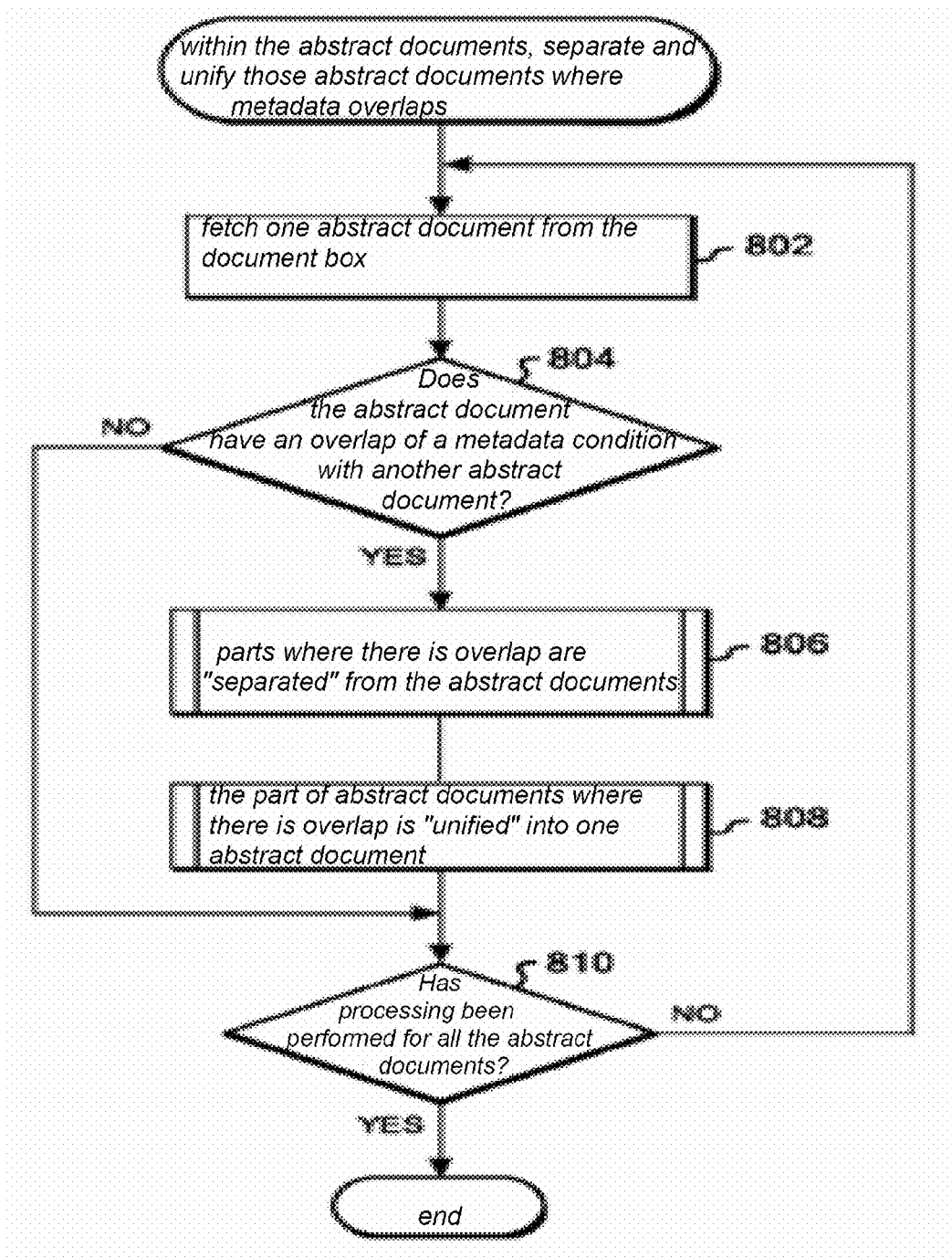
FIG. 8 shows a flowchart of dividing and integrating, among the abstract documents, those abstract documents where there is an overlap of metadata according to an embodiment of the present invention.

Next, the processing of the separation and unification routine 214 will be explained while referring to the flowchart of FIG. 8. This separation and unification routine 214 performs separation and unification processing of those abstract documents where there is overlap of the metadata.

During step 802, the separation and unification routine 214 fetches one abstract document from the document box.

During step 804, a determination is made as to whether the fetched abstract document has an overlap of a metadata condition with another abstract document in the document box. If there is no such overlap, execution proceeds to step 810.

If it is determined that there is overlap of a metadata condition of the fetched abstract document with the condition of metadata of another abstract document, the separation and unification routine 214 during step 806 calls the separation routine 216, the part of abstract document where there is overlap is "separated" from the abstract documents and overlapped part is taken out. Next, the separation and unification routine 214, during step 808, calls the unification routine 218, the part of the abstract document where there is overlap is "unified" into one abstract document, and execution proceeds to step 810.

During step 810, the separation and unification routine 214 makes a determination as to whether processing has been performed for all the abstract documents in the document box, and if processing has not been performed for all the abstract documents, execution returns to step 802. If such processing has been performed for all the abstract documents, execution ends.

Figure 9:
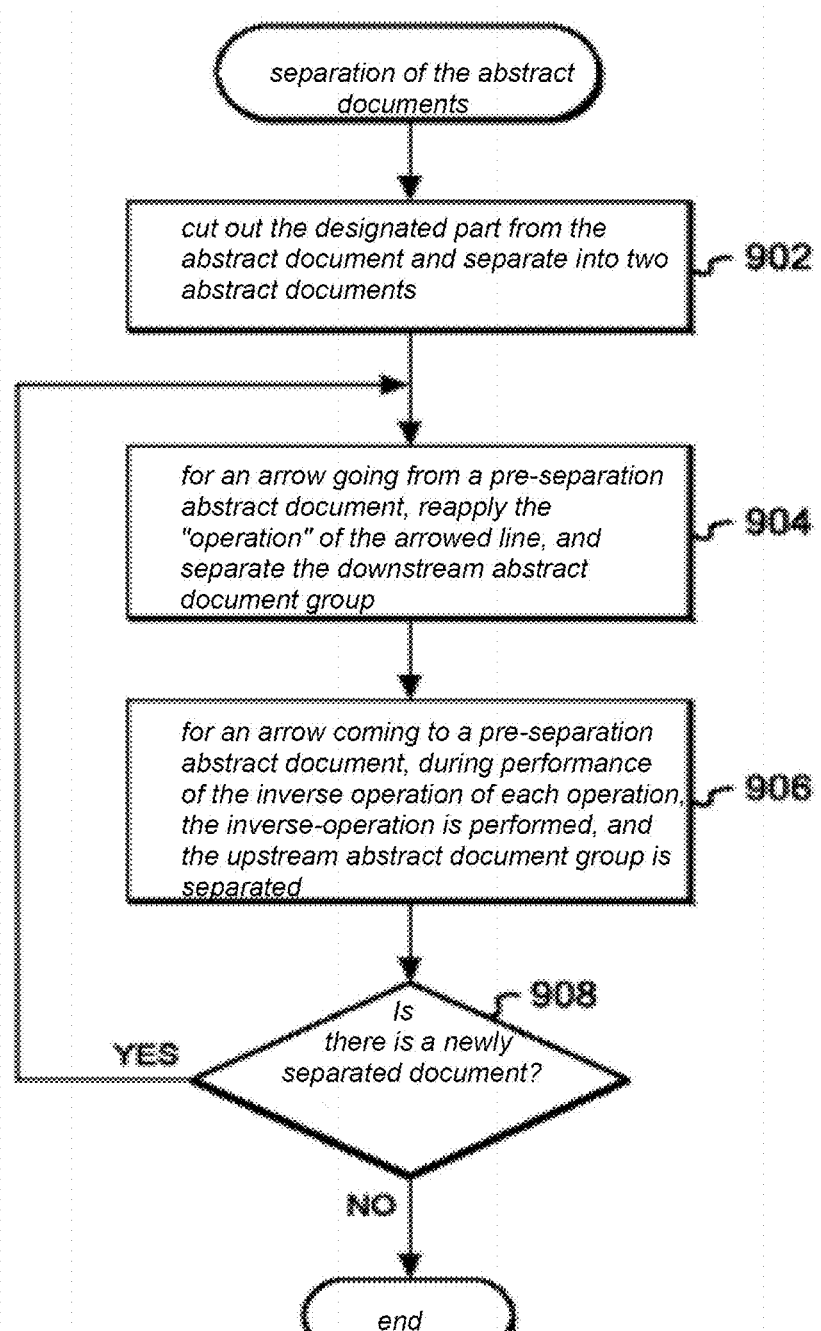
FIG. 9 shows a flowchart of abstract document separation processing according to an embodiment of the present invention.

Next, the processing of the separation routine 216 will be explained while referring to the flowchart of FIG. 9. During step 902, the separation routine 216 cuts from the abstract document the designated part, i.e. the part that is determined to satisfy the input conditions during step 606 or the part that is sensed to have overlap during step 804, and the abstract document is separated into two abstract documents.

During step 904, the separation routine 216 reapplies the "operation" of the arrowed line going from the pre-separation abstract document, and the downstream abstract document is separated.

During step 906, in the case of performance of an inverse-operation on each document where an arrowed line goes into a pre-separation abstract document, the separation routine 216 performs such an inverse-operation, and the upstream abstract document group is separated.

During step 908, the separation routine 216 determines whether there is a newly separated abstract document, and if there is such a newly separated abstract document, execution returns to step 904. If there is not such a newly separated abstract document, processing ends.

Figure 10:
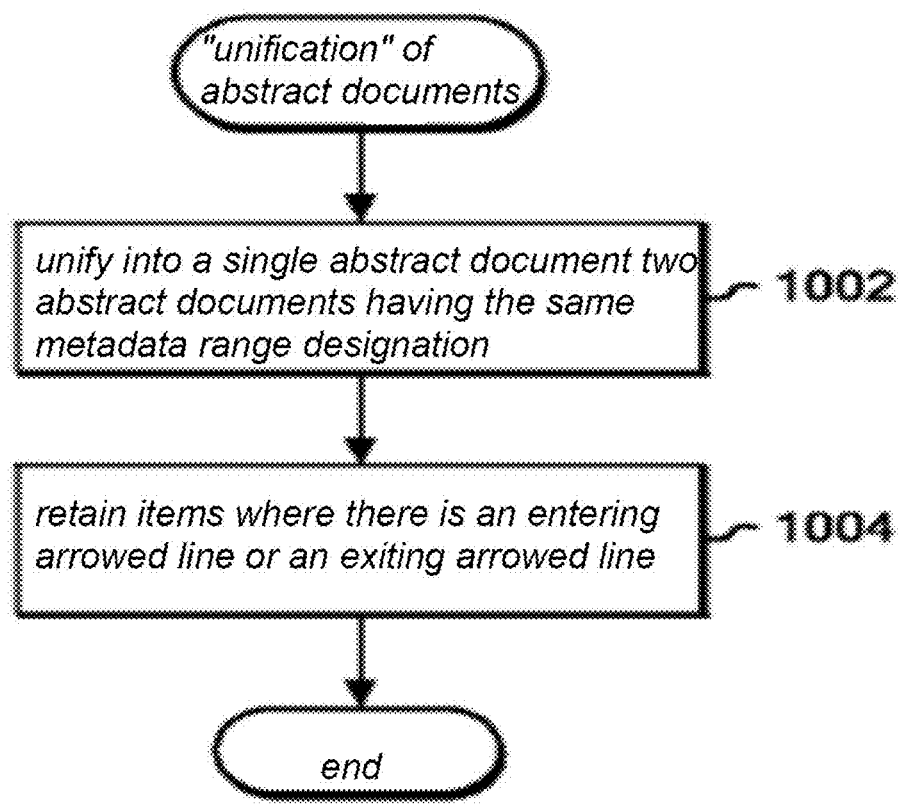
FIG. 10 shows a flowchart of abstract document unification processing according to an embodiment of the present invention.

Next, the processing of the unification routine 218 will be explained while referring to the flowchart of FIG. 10. During step 1002, the unification routine 218 unifies into a single abstract document two abstract documents having the same metadata range designation.

During step 1004, the unification routine 218 performs connection of the arrowed line pointing to and from unified abstract documents, so as to retain items of both of the pre-unified abstract documents.

Figure 11:
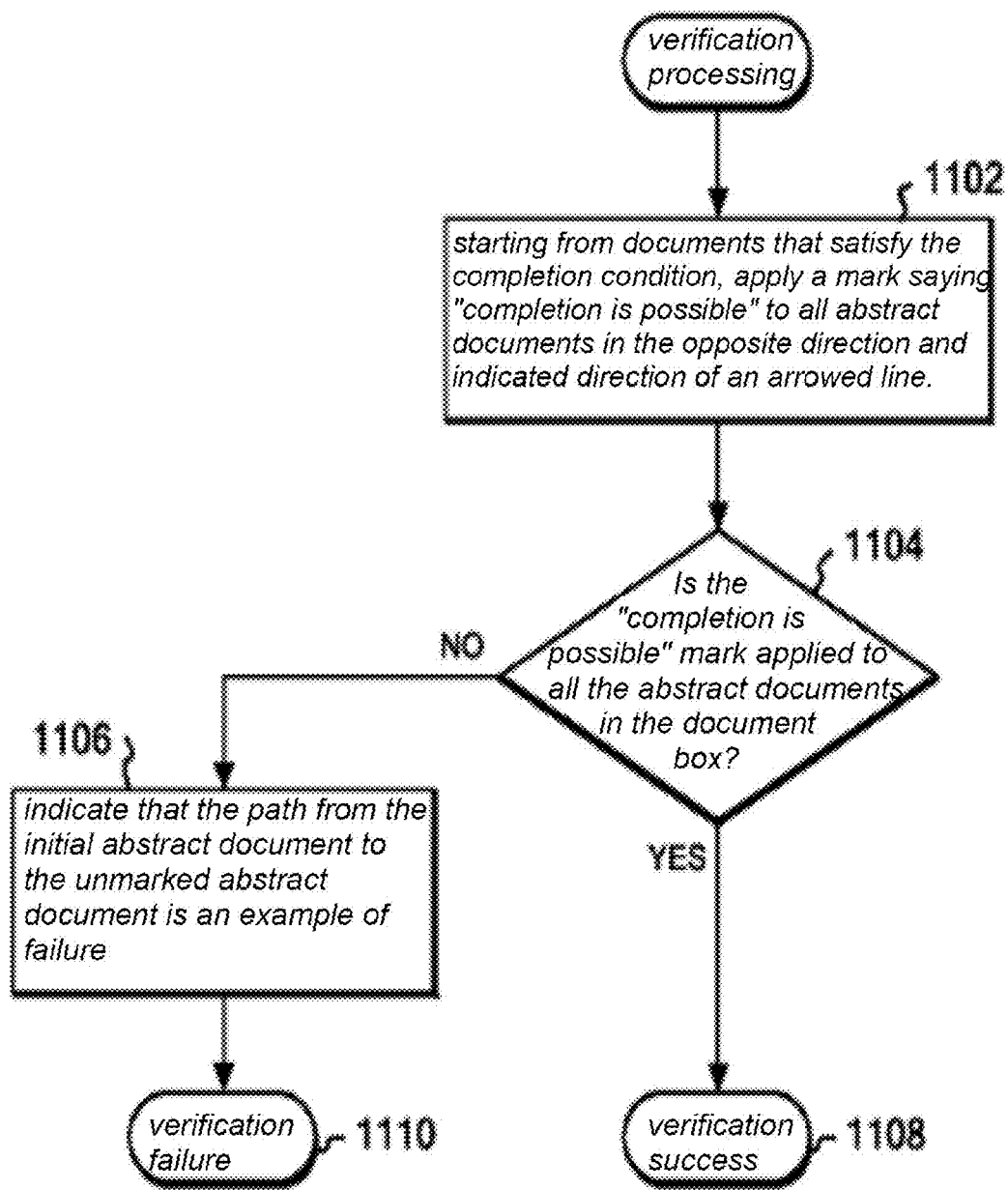
FIG. 11 shows a flowchart of verification processing according to an embodiment of the present invention.

Next, the processing of the verification routine 220 will be explained while referring to the flowchart of FIG. 11. During step 1102, from the abstract document group that satisfies the completion condition, the verification routine 220 applies a mark saying "completion is possible" to all abstract documents in the opposite direction of an arrowed line. In this case, due to the abstract documents connected together by arrows forming a graph structure, a known general graph query algorithm for deepest-first searching or the like can be used.

During step 1104, the verification routine 220 determines if a "completion is possible" mark is applied to all the abstract documents within the document box, and if that is the case, process ends as a verification success 1108.

If there is a determination that there exists an abstract document within the document box for which the "completion is possible" mark is not applied, then the verification routine 220 preferably indicates on the display 114 that the path from the initial abstract document to the unmarked abstract document is an example of failure, and processing ends as a verification failure 1110.

Next, a specific example of processing of the present invention will be explained for a document centric system while referring to FIGS. 12 to 20. In this case, firstly the below listed assumptions are made. Although the actual metadata are generally more complex than this example, for convenience, understanding will be aided by explanation of a simple example.

Metadata A and B are attached to a document.

Initial documents: A is greater than or equal to 0 and less than or equal to 20, and B is 0.

Operation X: The operation is performed on documents where A is less than 30, and as a result, A is set to 40, and B is set to A.

Operation Y: The operation is performed on documents where A is greater than 10 and less than 50, and as a result, A is set to 100.

Operation Z: The operation is performed on documents where A is greater than or equal to 40 and B is less than 10, and as a result, B is set to 100.

Completion condition: Documents where A and B have both become 100 are set to "process completed."

The function of this example system is to verify the correctness of this document centric system under the aforementioned assumptions.

Figure 12:
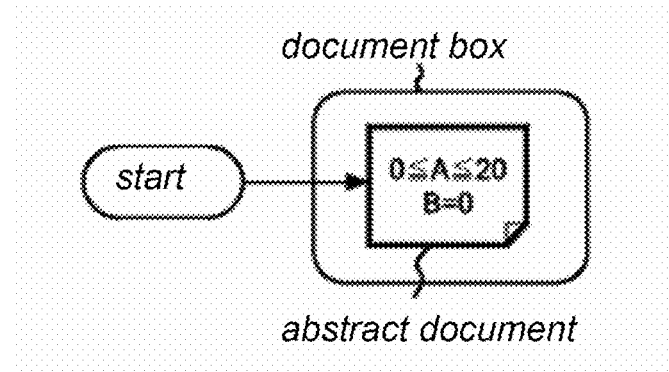
FIG. 12 shows an example of processing according to an embodiment of the present invention.

This example system firstly, as shown in FIG. 12, places the initial condition abstract documents in the document box 206.

Figure 13:
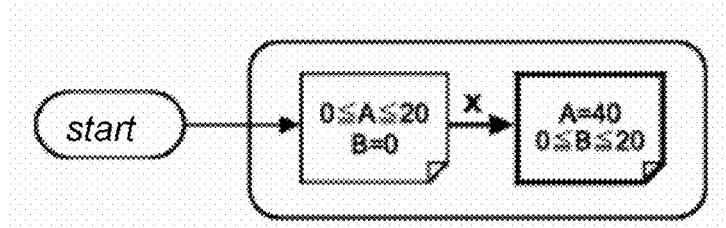
FIG. 13 shows an example of processing according to an embodiment of the present invention.

Next, the system of this example, as shown in FIG. 13, tries to apply operation X to the initial condition abstract documents. By this means, from the abstract documents that had metadata where "0 A 20, B=0", abstract documents are generated that have metadata where "A=40, 0 B 20". This corresponds to the processing of step 406 to step 412 of the flowchart of FIG. 4. However, at the present stage, the separation or unification requirements are not met during step 408 and step 412, so no processing is performed at those steps.

Figure 14:
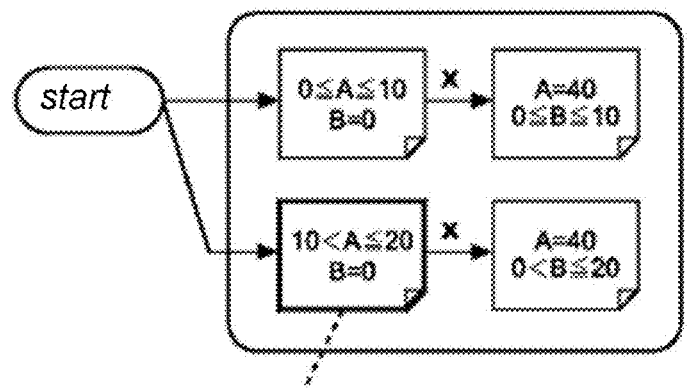
FIG. 14 shows an example of processing according to an embodiment of the present invention.

Next, as shown in FIG. 14, the system of this example fetches operation Y, and during step 408, the part capable of application of the operation Y is separated. Then as shown in FIG. 15, during step 410, the abstract documents resulting from the operation Y are added to the document box.

Figure 15:
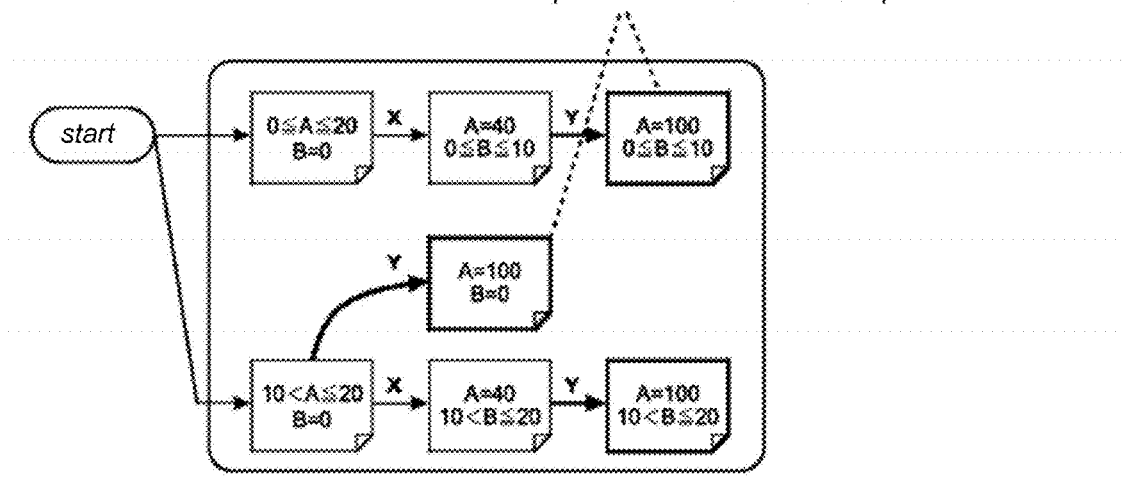
FIG. 15 shows an example of processing according to an embodiment of the present invention.
Figure 16:
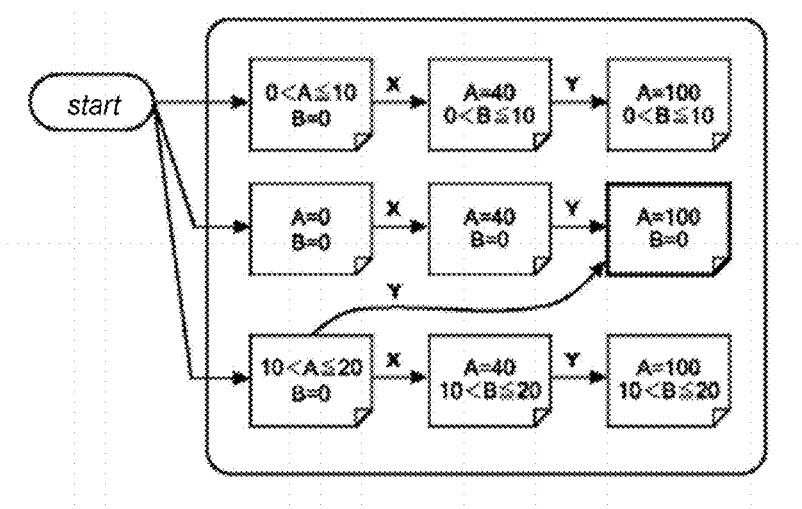
FIG. 16 shows an example of processing according to an embodiment of the present invention.

Next, with respect to the state of the abstract documents of FIG. 15, the system of this example during step 410 detects overlap in two abstract documents, so separates and unifies the overlapping portion. As a result, the state of the abstract documents within the document box becomes that of FIG. 16.

Figure 17:
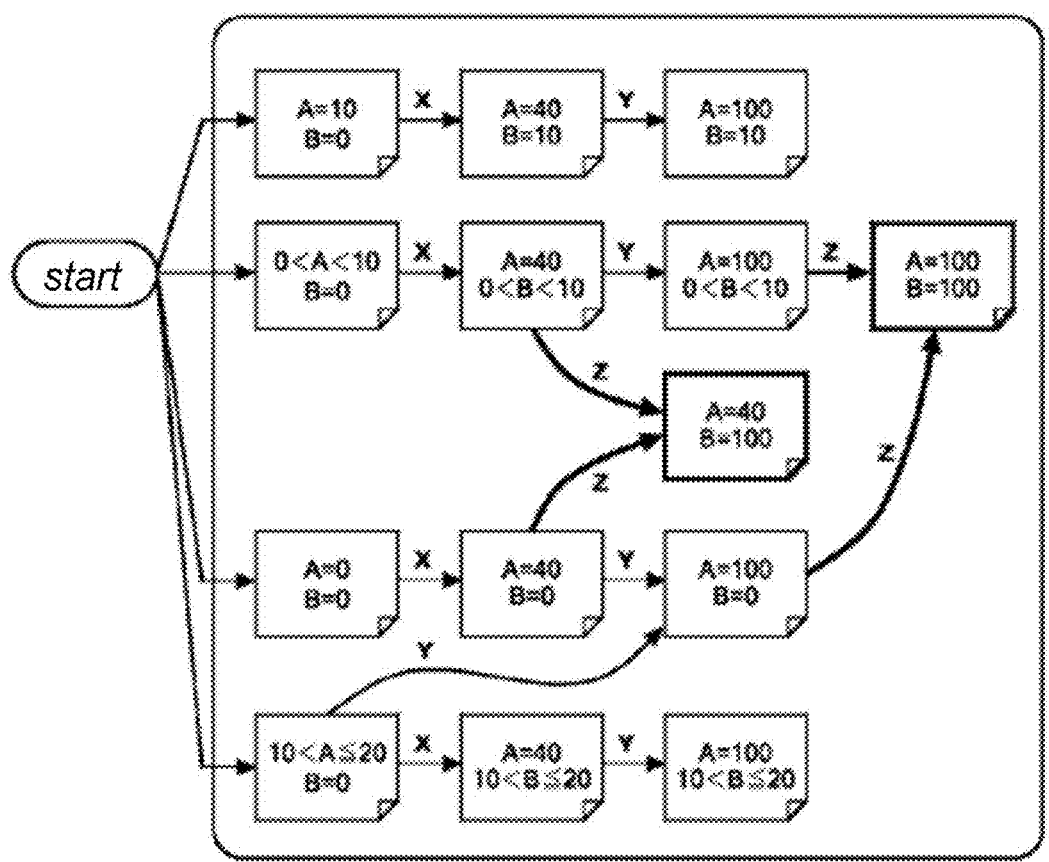
FIG. 17 shows an example of processing according to an embodiment of the present invention.

Next, the system of this example fetches operation Z and then executes steps 408, 410, and 412. The resultant state is shown in FIG. 17.

Figure 18:
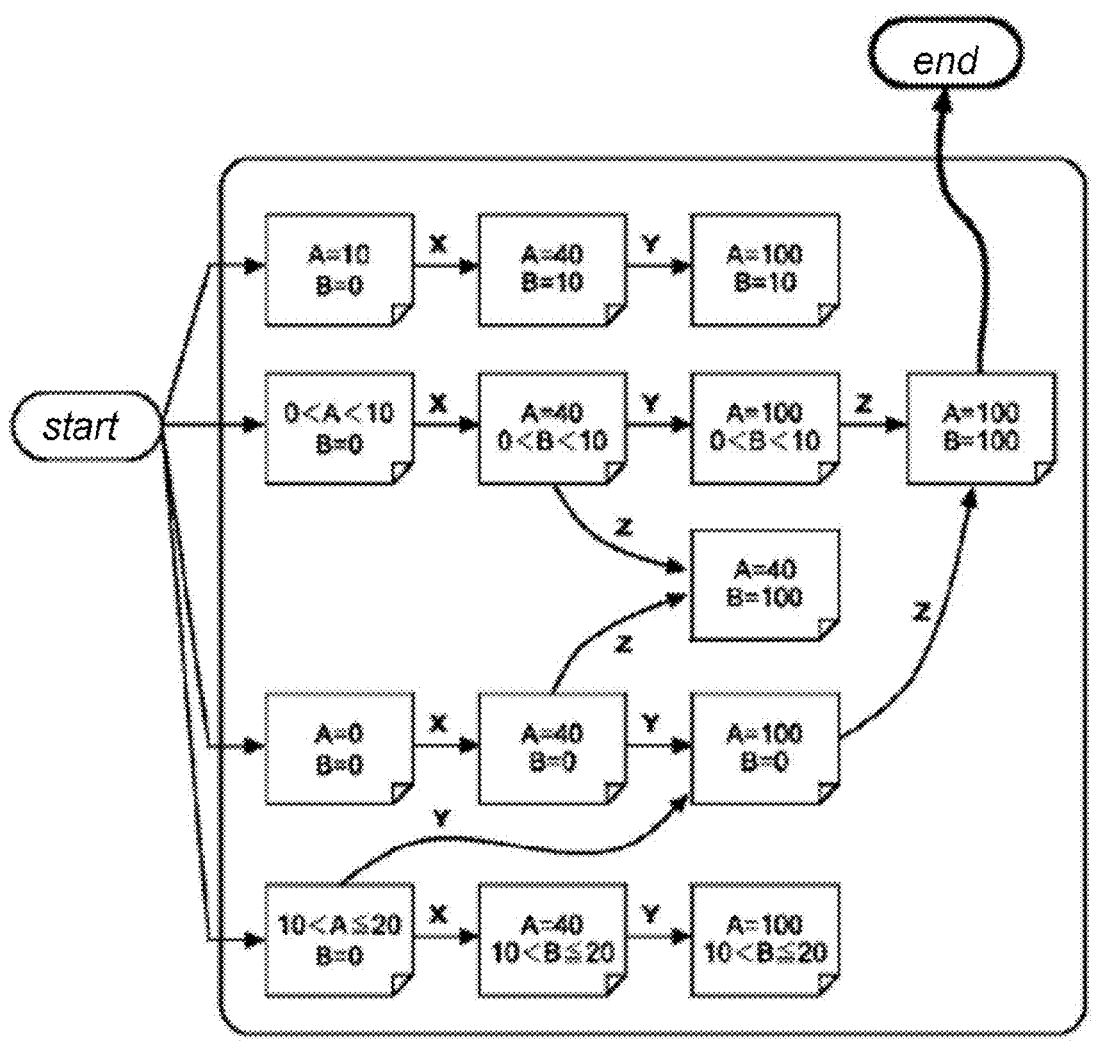
FIG. 18 shows an example of processing according to an embodiment of the present invention.
Figure 19:
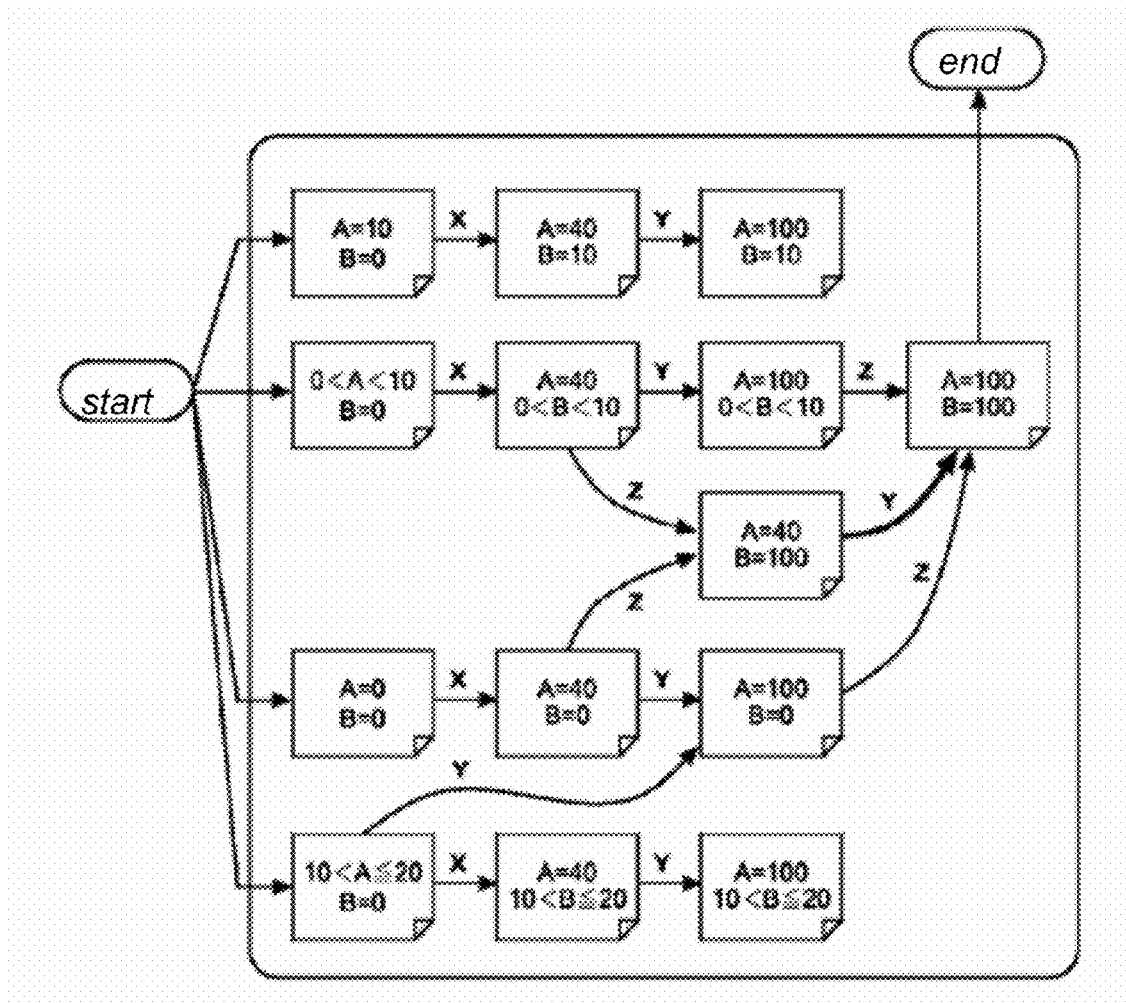
FIG. 19 shows an example of processing according to an embodiment of the present invention.

Next, the system of this example uses the completion condition (1st iteration), and those documents where A and B have both become 100 are set to "processing is completed." The result of this processing is shown in FIG. 18. Due to the completion above of application of the 1st iteration for all the operations and the completion condition, execution proceeds to step 416. However, there have been changes to the states of the abstract documents in the document box relative to the previous iteration (initial condition) so processing returns to step 406 in order to apply the 2nd iteration steps.

During application of the 2nd iteration steps, firstly the operation X is fetched (2nd iteration) in the same manner as during the 1st iteration, and steps 408, 410, and 412 are similarly executed without change. Thereafter, the system of this example fetches operation Y (2nd iteration) and executes the steps 408, 410, and 412. This results in the conditions shown in FIG. 19.

Figure 20A:
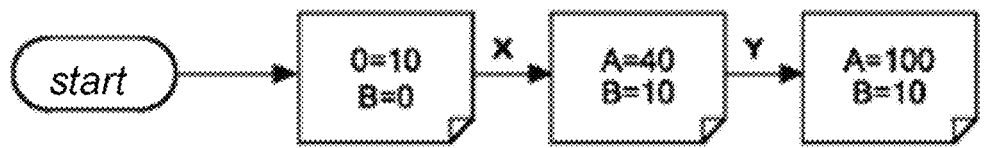
FIG. 20A shows an example of processing according to an embodiment of the present invention.
Figure 20B:
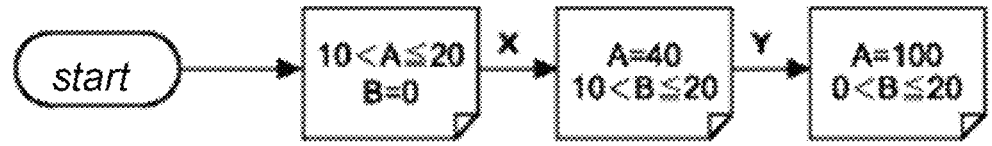
FIG. 20B shows an example of processing according to an embodiment of the present invention.

Thereafter, the system of this example uses operation Z (2nd iteration), uses the completion condition (2nd iteration), uses the operation X (3rd iteration), and uses the operation Y (3rd operation). However, since there is no change, the result of step 416 becomes negative, and execution proceeds to the verification operation step 420. Results of the verification operation during step 420 for the finished state transition diagram (FIG. 19), due to the transition patterns shown in FIGS. 20A and 20B, are understood to generate unprocessed documents. Therefore the system of this example provides a determination that "the specification is not correct."

Although the present invention was explained in the aforementioned manner using a specific example, the specific operating system and platform are not limiting, and it can be understood by one skilled in the art of this field that application is possible using an arbitrary computer system.

What is claimed is:

1. A method for verifying a specification, comprising the steps of:
   (a) retaining, by a processor of a computer system, a plurality of abstract documents, each said abstract document of said plurality indicating a value corresponding to a metadata of that document;
   (b) separating, by the processor, a group of abstract documents based on an input condition of an operation;
   (c) adding, by the processor, a new abstract document to said group by using, based on an output condition, at least one said operation within a group of said operations;
   (d) separating, by the processor, said abstract documents according to overlapping ranges of values designated by each said metadata of abstract documents indicated in said group;
   (e) unifying, by the processor, said abstract documents according to overlapping ranges of values designated by each said metadata of abstract documents indicated in said group;
   (f) repeating said steps (b) to (e) until a termination condition is satisfied; and
   (g) verifying, by the processor, whether an incomplete abstract document exists when said termination condition is satisfied;
   wherein said plurality of abstract documents associated with a plurality of said metadata are processed;
   wherein said group of said operations are applied collectively by an operation specification specifying document processing operations;
   wherein said input condition that is a condition of a range of values of said metadata capable of application of a respective operation is retained for each of said operation; and
   wherein an output condition that is a change of said metadata value after use of said respective operation is retained for each of said operation.

2. The method according to claim 1, further comprising the step of:
   forming a graph structure by forming nodes from said abstract documents and links from said operations and retaining said abstract documents.

3. The method according to claim 2,
   wherein said termination condition comprises detecting that said abstract documents have not been changed by said applied operations.

4. The method according to claim 3, further comprising the step of:
   repeating said use of said operations at least one time before said step of verifying, in response to detection of non-occurrence of change of said abstract documents by said applied operations.

5. The method according to claim 2,
   wherein said operation specification comprises a completion condition described by a specific state of said metadata; and wherein said step of verifying further comprises the steps of:

applying a completion mark, among said abstract documents that satisfy said completion condition, to reverse abstract documents that arrived at said graph structure in reverse order; and determining verification failure if said reverse abstract document is without an applied completion mark.

6. The method according to claim 5, further comprising the step of:

presenting, among initial abstract documents, a path going up to said abstract document without said applied completion mark as a failure example.

7. A computer readable product comprising a non-transitory storage medium tangibly embodying a computer readable program code having computer readable instructions which when implemented, cause a computer to carry out the steps of a method comprising:

(a) retaining, by a processor of a computer system, a plurality of abstract documents, each said abstract document of said plurality indicating a value corresponding to a metadata of that document;

(b) separating, by the processor, a group of abstract documents based on an input condition of an operation;

(c) adding, by the processor, a new abstract document by using, based on an output condition, at least one said operation within a group of operations;

(d) separating, by the processor, said abstract documents according to overlapping ranges of values designated by each said metadata of abstract documents indicated in said group;

(e) unifying, by the processor, said abstract documents according to overlapping ranges of values designated by each said metadata of abstract documents indicated in said group;

(f) repeating said steps (b) to (e) until a termination condition is satisfied; and (g) verifying, by the processor, whether an incomplete abstract document exists when said termination condition is satisfied;

wherein said plurality of abstract documents associated with a plurality of said metadata are processed;

wherein said group of said operations are applied collectively by an operation specification specifying document processing operations;

wherein said input condition that is a condition of a range of values of said metadata capable of application of a respective operation is retained for each of said operation; and wherein an output condition that is a change of said metadata value after use of said respective operation is retained for each of said operation.

8. The computer readable storage medium according to claim 7, further comprising the step of:

forming a graph structure by forming nodes from said abstract documents and links from said operations and retaining said abstract documents.

9. The computer readable storage medium according to claim 7, wherein said termination condition comprises detecting that said abstract documents have not been changed by said applied operations.

10. The computer readable storage medium according to claim 9, further comprising the step of:

repeating said use of said operations at least one time before said step of verifying, in response to detection of non-occurrence of change of said abstract documents by said applied operations.

11. The computer readable storage medium according to claim 8, wherein said operation specification comprises a completion condition described by a specific state of said metadata; and wherein said step of verifying further comprises the steps of:

applying a completion mark, among said abstract documents that satisfy said completion condition, to reverse abstract documents that arrived at said graph structure in reverse order; and determining verification failure if said reverse abstract document is without an applied completion mark.

12. The computer readable storage medium according to claim 11, further comprising the step of:

presenting, among initial abstract documents, a path going up to said abstract document without said applied completion mark as a failure example.

13. A specification verification system, comprising:

a processor device configured to:

(a) retain a plurality of abstract documents, each said abstract document of said plurality indicating a value corresponding to a metadata of that document;

(b) separate a group of abstract documents based on an input condition of an operation;

(c) add a new abstract document to the separated group by using, based on an output condition, at least one said operation within a group of said operations;

(d) separate said abstract documents according to overlapping ranges of values designated by each said metadata of abstract documents indicated in said group;

(e) unify said group of abstract documents according to overlapping ranges designated by each said metadata of abstract documents indicated in said group;

(f) repeat functions (b) to (e) until a termination condition is satisfied; and (g) verify whether an incomplete abstract document exists when said termination condition is satisfied;

wherein said plurality of abstract documents associated with a plurality of said metadata are processed;

wherein said group of said operations are applied collectively by an operation specification specifying document processing operations;

wherein said input condition that is a condition of a range of values of said metadata capable of application of a respective operation is retained for each of said operation; and wherein an output condition that is a change of said metadata value after use of said respective operation is retained for each of said operation.

14. The system according to claim 13, wherein said processor device is further configured to:

form a graph structure by forming nodes from said abstract documents and links from said operations and retaining said abstract documents.

15. The system according to claim 13, wherein said termination condition comprises detecting that said abstract documents have not been changed by said applied operations.

16. The system according to claim 15, wherein said processor device is further configured to:
  repeat said use of said operations at least one time before said verification of whether said incomplete abstract document exists, in response to detection of non-occurrence of change of said abstract documents by said applied operations.

17. The system according to claim 14,
wherein said operation specification comprises a completion condition described by a specific state of said metadata; and
wherein said processor device is further configured to:
apply a completion mark, among said abstract documents that satisfy said completion condition, to reverse abstract documents that arrived at said graph structure in reverse order; and
determine verification failure if said reverse abstract document is without an applied completion mark.

18. The system according to claim 17, wherein said processor device is further configured to:
  present, among initial abstract documents, a path going up to said abstract document without said applied completion mark as a failure example.

* * * * *